US 6,641,719 B1

(12) United States Patent
Naito

(10) Patent No.: US 6,641,719 B1
(45) Date of Patent: Nov. 4, 2003

(54) WATER PURIFIER FOR USE WITH BOTTLE CONTAINER

(76) Inventor: Yosuke Naito, 654-235, Kamiya-cho, Kasugai-shi, Aichi (JP)

( * ) Notice: Subject to any disclaimer, the term of this patent is extended or adjusted under 35 U.S.C. 154(b) by 0 days.

(21) Appl. No.: 10/130,708

(22) PCT Filed: Nov. 24, 2000

(86) PCT No.: PCT/JP00/08332

§ 371 (c)(1),
(2), (4) Date: May 22, 2002

(87) PCT Pub. No.: WO01/40116

PCT Pub. Date: Jun. 7, 2001

(30) Foreign Application Priority Data

Nov. 30, 1999 (JP) .......................................... 11-339167

(51) Int. Cl.⁷ .......................... B01D 27/02; B01D 35/02
(52) U.S. Cl. ......................... 210/136; 210/282; 210/472
(58) Field of Search ................................ 210/136, 282, 210/446, 464, 472, 484

(56) References Cited

U.S. PATENT DOCUMENTS 2,222,123 A * 11/1940 Schwab ...................... 210/282
5,609,759 A    3/1997 Nohren, Jr. et al. ........ 210/266

FOREIGN PATENT DOCUMENTS

JP       11-77026      *  3/1999
JP      2000061456         2/2000

* cited by examiner

Primary Examiner—Ivars Cintins
(74) Attorney, Agent, or Firm—Clark & Brody

(57) ABSTRACT

A water purifier (1) for use with bottle containers, capable of being installed easily on a bottle container such as a PET bottle and capable of efficiently purifying water by allowing the flow rate of the purified water to be stable, includes a filter case (2) and a filter medium (3) charged therein. Wherein a joint (5) fittable to a filler port (Pm) of the PET bottle (P) is provided at the upstream side end part of the filter case (2), a vent tube (6) extends from the outside of the PET bottle (P) to the inside of the PET bottle (P) through the wall surface of the joint (5) and the filler port (Pm), air flows through the vent tube (6) into the PET bottle when water is passed from the filler port (Pm) through the water purifier (1). At the time of water purification, air flow control means capable of controlling the flow rate of air flowing into the bottle container may be provided in the vent tube (6). An air chamber (14) for expanding the air passage of the vent tube (6) may be provided at midpoint on the vent tube (6), and a funnel part (28b) for collecting the purified water into a water supply hole (M) and allowing the water to flow downward may be provided on the downstream side of the filter case (2).

10 Claims, 9 Drawing Sheets

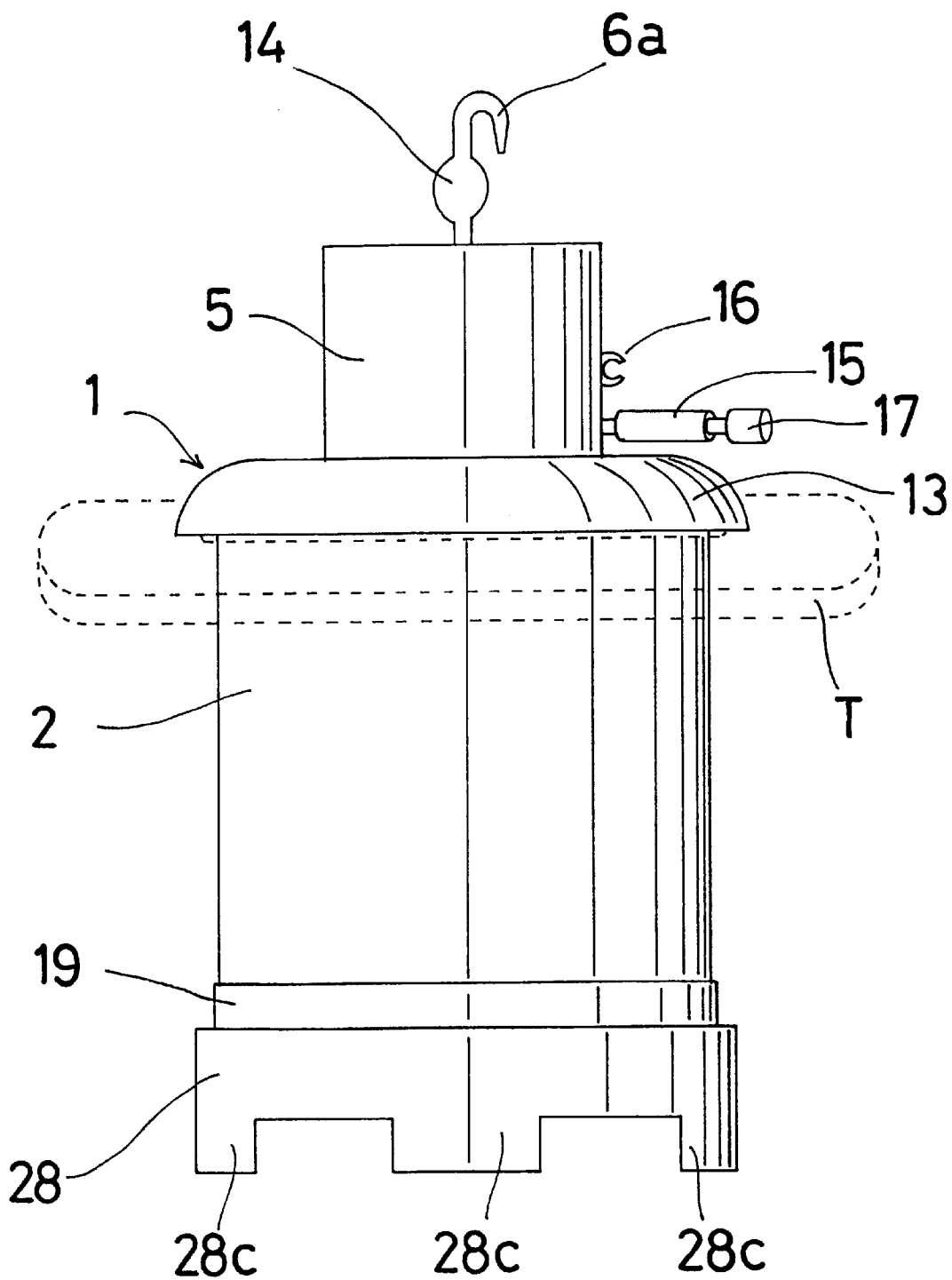
F I G. 1

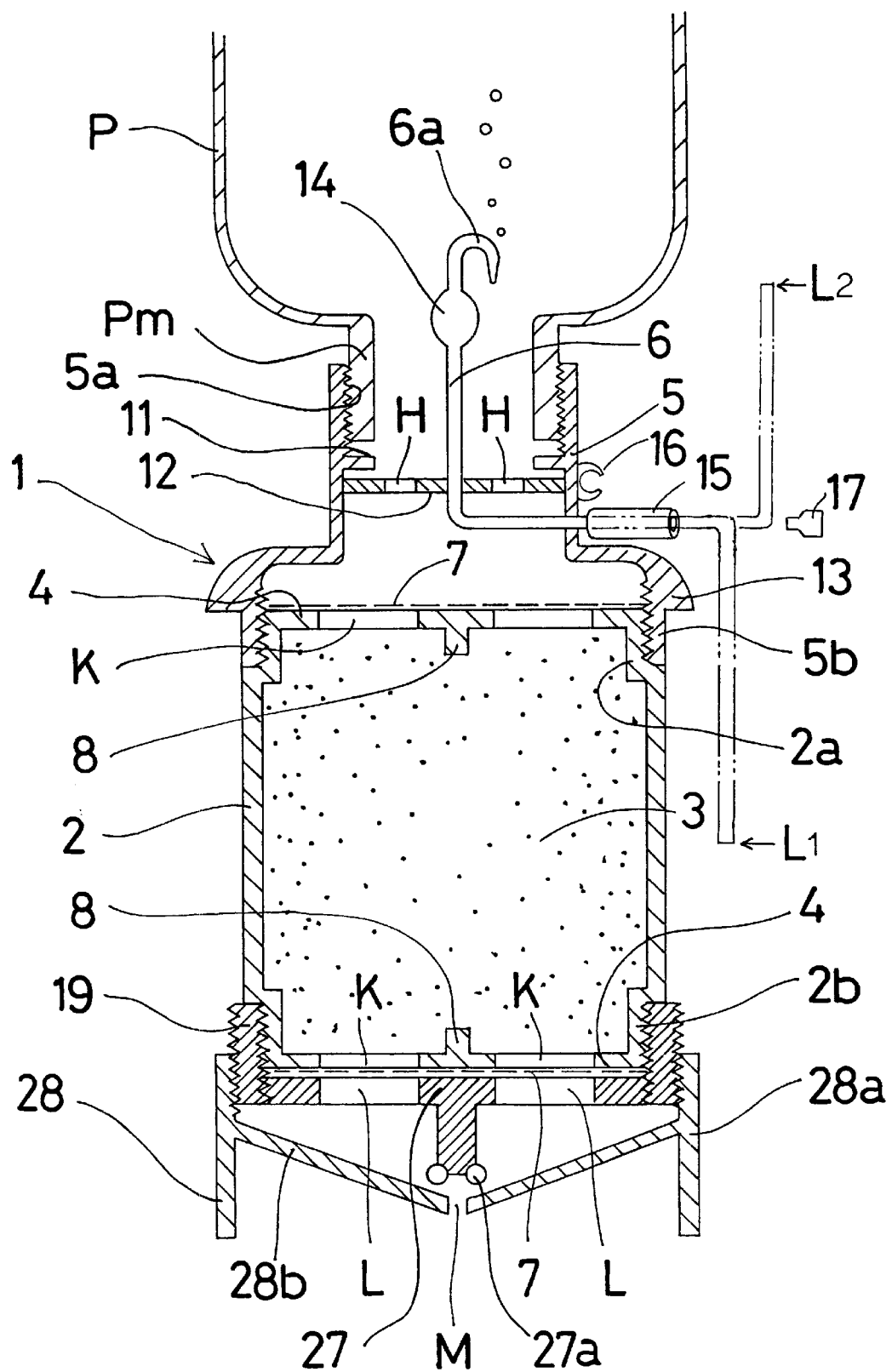
F I G. 2

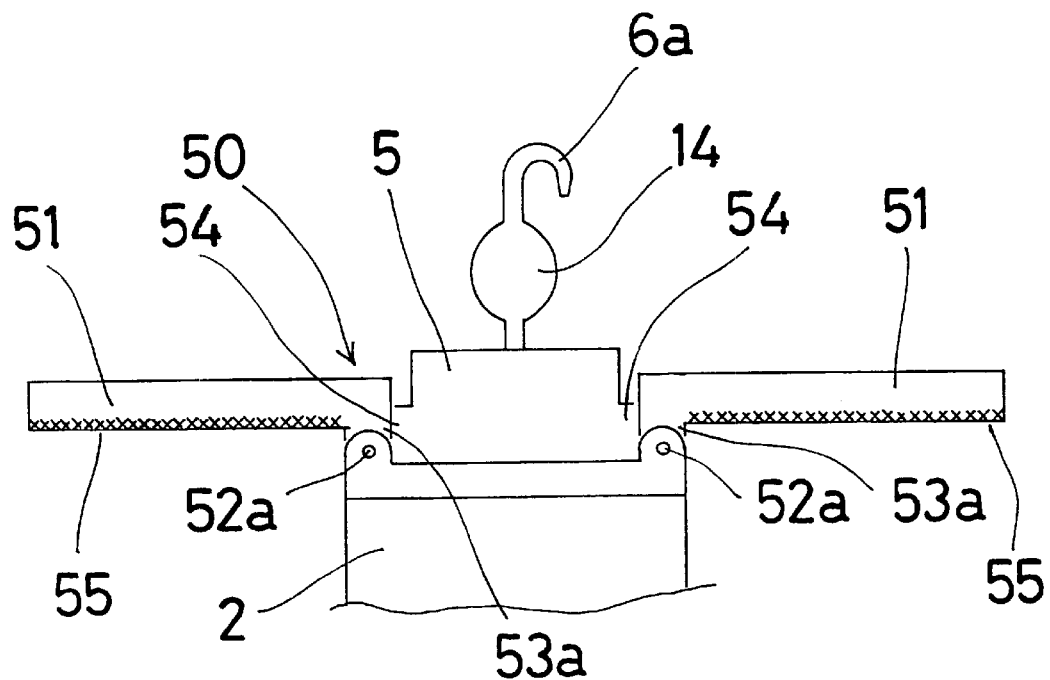
F I G. 6
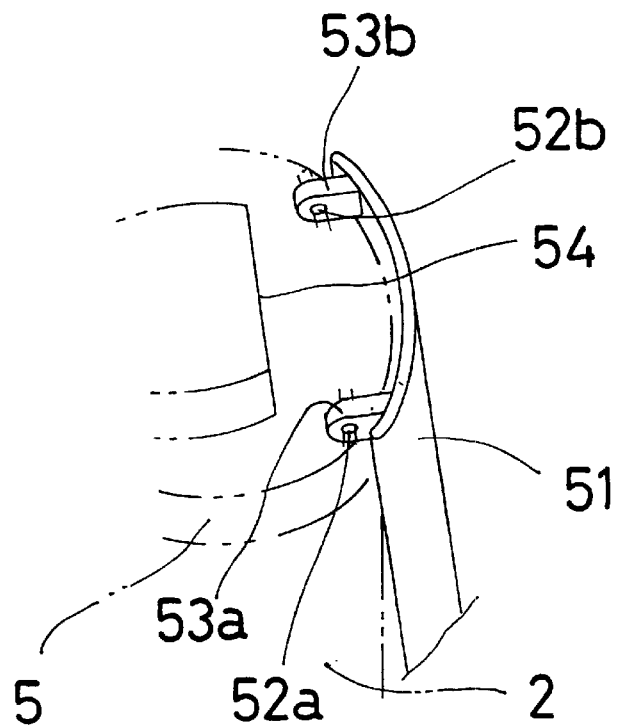
F I G. 7

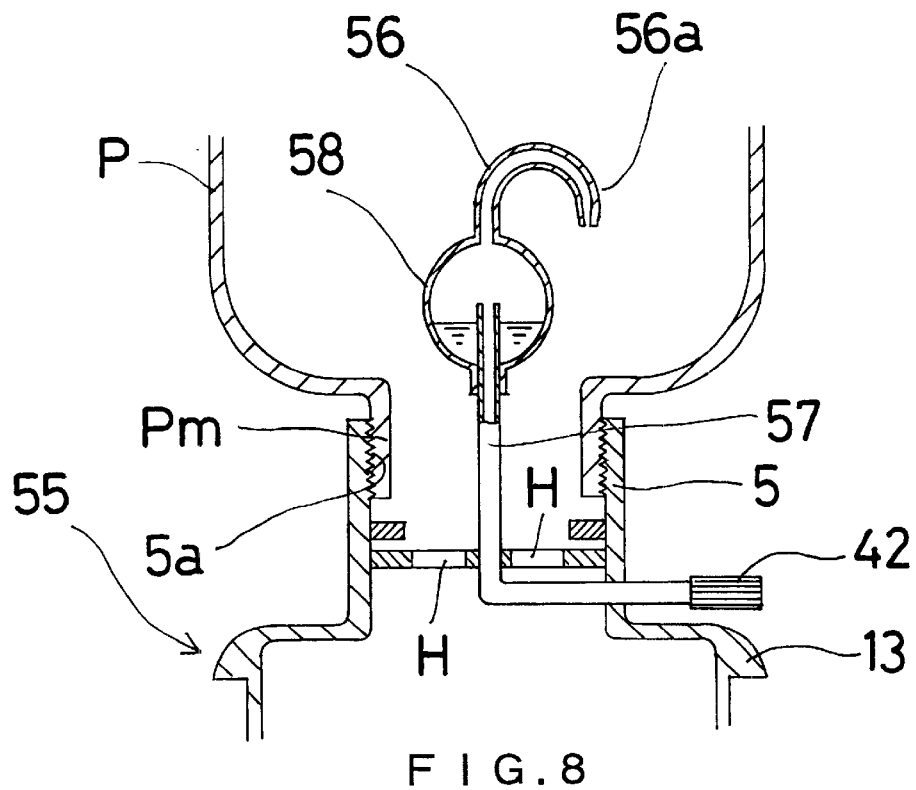
F I G. 8
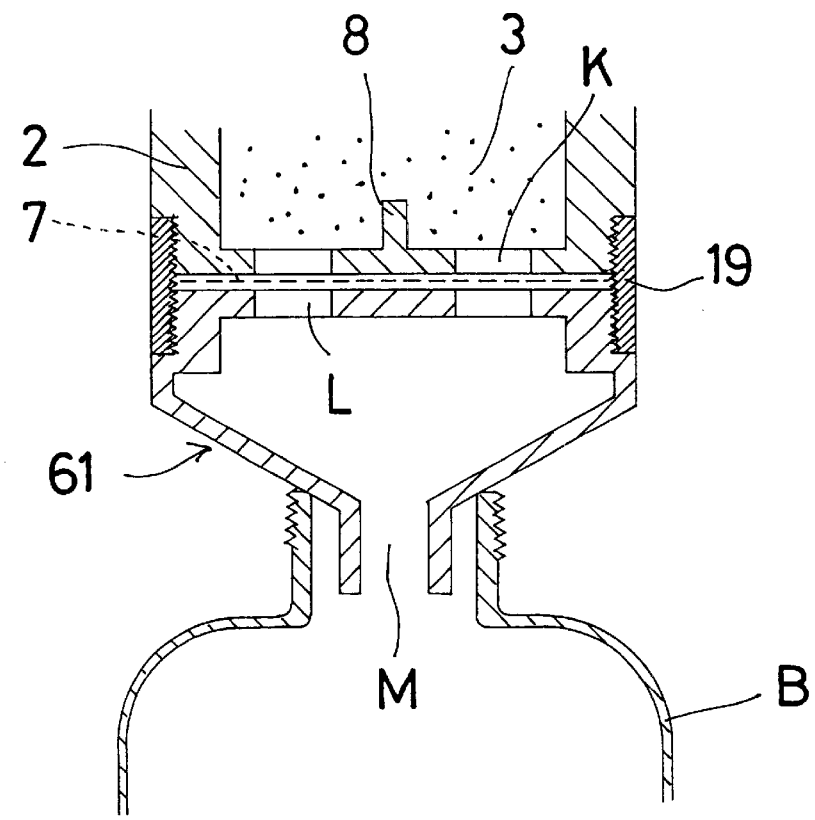
F I G. 9

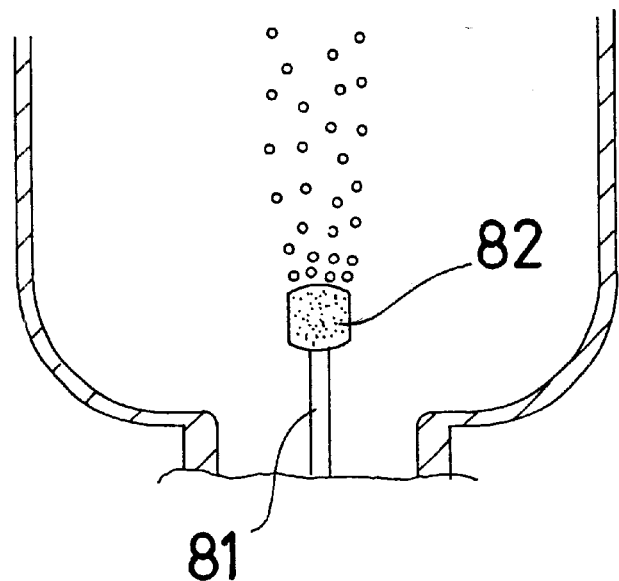
F I G. 1 2
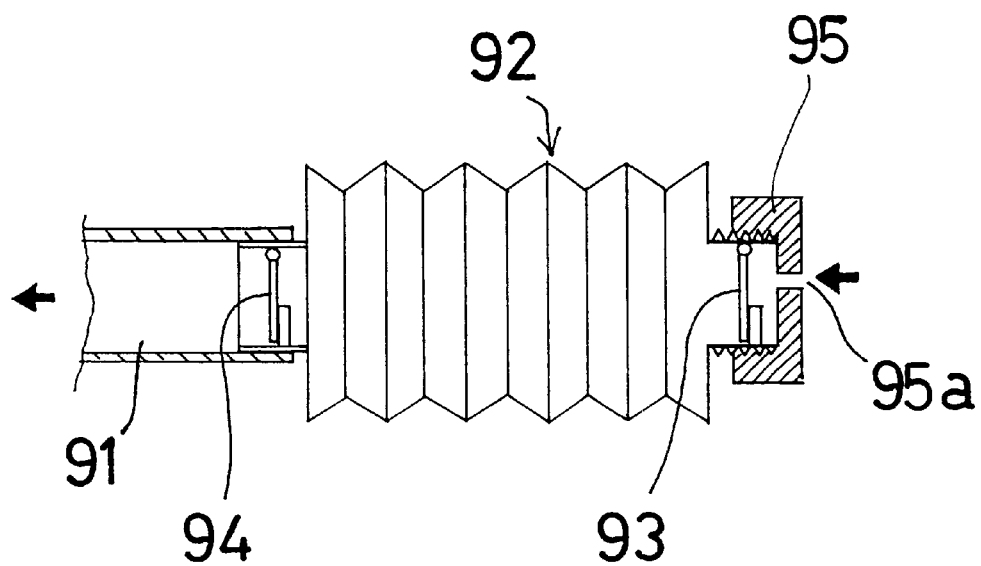
F I G. 1 3

WATER PURIFIER FOR USE WITH BOTTLE CONTAINER

FIELD OF INVENTION

This invention relates to a water purifier for use with bottle containers such as PET (polyethylen terephthalate) bottles as well as other plastic bottles, glass, ceramic, and metallic bottles.

BACKGROUND OF THE INVENTION

In recent years, PET (polyethylene terephthalate) bottles have been widely used as filling containers for carbonated drinks, mineral water, etc. It is suggested that PET bottles should be recycled in various ways due to their lightness in weight, durability and corrosion fatigue resistance.

As described in the official gazette of Japanese Patent Application Nos. 9-24365 and 11-77026, a PET bottle can be recycled as a water purifier by placing a filter in the filler port of the bottle. In this case, a cap wherein a filter medium is provided should be mounted in the filler port of the PET bottle. A water supply hole should be provided on the edge of the cap of the water purifier. When the PET bottle is slanted to pour the water into a glass or the like, the water inside the bottle will be purified through the filter medium.

When water runs through the aforementioned conventional water purifier for use with the bottle container, purified water does not come out easily from the water purifier since there is no air passage for allowing air into the bottle and air will possibly enter the bottle through the filler port. Especially if a large amount of water is poured from the PET bottle, the air bubble brought into the bottle will disturb the water stream, and eventually the water purification rate will decrease.

This inconvenience may be overcome by providing air holes on the bottom of the PET bottle. However, this is not recommended since processing PET bottles in such a way is complicated, and this may cause the PET bottle to have a water leakage.

In addition, the conventional water purifier for use with a bottle container has another inconvenience in that water cannot be filtrated at a stable rate which makes it difficult to improve the water purification and obtain good quality purified water.

Therefore, the present invention was made in the light of the above inconvenience, enabling the water purifier to be easily installed on bottle containers such as PET bottles or the like and purifying water efficiently. Also, this invention has a purpose to provide a water purifier for use with bottle containers, which can freely control the speed of the purification and provide highly-purified water.

SUMMARY OF THE INVENTION

To overcome the aforementioned inconveniences, a water purifier for use with bottle containers disclosed here is a water purifier which can be movably attached to the filler port of the bottle container and also can be readily removed, comprises a filter case; a filter medium fixed inside the said filter case; a joint part extending from the upper side of the said filter case and mounted in the filler port of the bottle container; and a vent tube extending from the outer surface of the bottle container to the wall surface of the joint part, also extending from the filler port to the inside of the bottle container.

When the water purifier as disclosed in this invention is fixed into the finer port of the bottle container and the bottle is turned upside down, the water inside the bottle comes down due to its own weight and runs through the filter medium. At this moment, the air entering the bottle through the vent tube will prevent air from entering the bottle through the filter port and the filter medium. Therefore, a stable volume of the water will be efficiently purified.

The following reasons are why a vent tube is installed through the wall around the joint of the water purifier for the bottle container.

1. If the vent tube is installed through the filter medium around the filler port, the purified water will drop down along the vent tube and this water will prevent the air stream toward the vent tube, which may destabilize the purifying speed.
2. If the vent tube is fixed from the filler port to the lower part of the joint on condition that the water purifier is fixed upon the water container, then the vent tube will contact the lower end of the water stands in the container which may stop the air.
3. If the vent tube is fixed through the filter medium, a watercourse may possibly be formed around the outer circumference of the vent tube and water may not go to the filter medium, then this will decrease the efficiency of the water purification.

According to the present invention of the water purifier for a bottle container, a system which can control air volume coming into the aforementioned bottle container will preferably be installed on the aforementioned vent tube, since the purifying performance of the filter medium can be adjusted by controlling the air volume of the vent tube, and also good quality purified water can be obtained by increasing the contacting time of the water and the filter medium.

Also, in this invention of the water purifier for a bottle container, an air chamber which can enlarge an air passage of the aforementioned vent tube will preferably be installed along the aforementioned vent tube.

If the air passage in the vent tube has a uniform diameter, water will flow backward by the water pressure in the bottle container. When a chamber is provided in the vent tube, air is temporarily pooled in the chamber before entering into the vent tube, and then the air is supplied into the bottle container. Pressure variation in the chamber is less than that in the air passage of the vent tube and inner pressure is almost evenly retained, thus the constant amount of air through the chamber will be evenly sent into the bottle container. Therefore, water does not easily flow backward because air is sent smoothly into the air passage which makes the amount of water purified stable and improves the purification.

In this invention with regard to the tabletop water purifier, it may be better to provide a funnel on the downstream of the foregoing filter in which the purified water is collected into the water supply hole and sent downward.

When a large amount of water is taken from the bottle container, air pressure in the bottle container is reduced which makes it easier to absorb external air into the bottle container from the downstream of the water purifier. If the aforementioned funnel is provided, water will be pooled in the water supply hole when water is purified, absorbing the external air into the bottle container is certainly prevented which makes the purified water flow more smoothly and the water purification operates more simply.

BRIEF DESCRIPTION OF THE DRAWINGS

FIG. 1 is a side view showing the water purifier used for the bottle container in the No. 1 embodiment of this invention.

FIG. 2 is a cross-sectional view showing the water purifier used for the bottle container in the No. 1 embodiment of this invention.

FIG. 6 is a partial cross sectional view showing the water purifier used for the bottle container in the No. 4 embodiment of this invention.

FIG. 7 is a partial oblique perspective view showing the water purifier used for the bottle container in the No. 4 embodiment of this invention.

FIG. 8 is a partial cross sectional view showing the water purifier used for the bottle container in the No. 5 embodiment of this invention.

FIG. 9 is a partial cross sectional view showing a variation of the aforementioned Nos. 1 to 5 embodiments of this invention.

FIGS. 11 to 13 are partial cross sectional views showing other variation of the Nos. 1 to 5 embodiments in this invention.

DETAILED DESCRIPTION OF THE PREFERRED EMBODIMENTS

Figure 3:
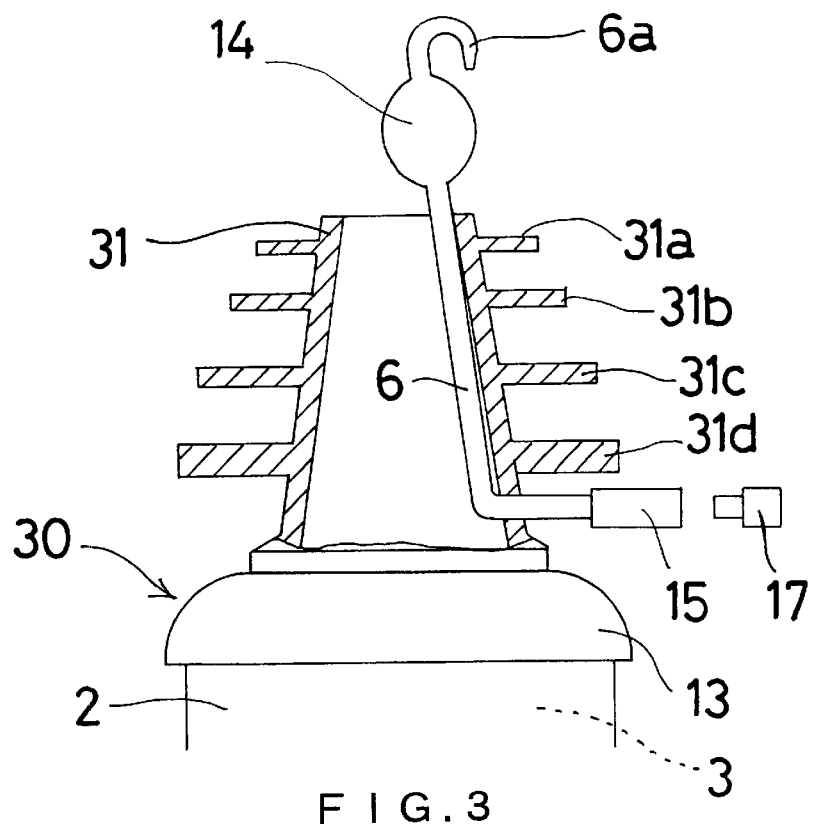
FIG. 3 is a cross sectional view showing the water purifier used for the bottle container in the No. 2 embodiment of this invention.

Embodiments in this invention are described as follows. FIGS. 1 and 2 show the water purifier for use with bottle container as the embodiment Nos. 1 and 2.

In the No. 1 embodiment of the water purifier, a filter medium (3) is fixed in the filter case (2) made of plastics, ceramics, metal or the like, in which water passes through the holes of the filter case (2). A joint (5) which can be engaged with the filler port (Pm) of PET bottles is provided on the upper end of the filter case (2). A vent tube (6) to send air into the PET bottle is installed in the said joint (5).

A female screw part (5a) to connect the joint (5) is provided on the filler port (Pm) of the PET bottle. When the female screw part (5a) is screwed into the base of the bottle filler port (Pm), the joint (5) is tightly engaged with the PET bottle, thus water does not leak from such an engaging part.

A stopper (11) is provided on the inner walls. When the female screw part (5a) is tightly screwed into the filler port (Pm), the stopper (11) prevents the female screw part (5a) from being excessively screwed in.

A guard (13) is formed beneath the joint (5). The lower part of the guard (13) is almost horizontally cut so that such part of the guard (13) can be hooked up with the outer mouth of a pan, kettle, water pitcher or the like, and thus the user's operation can also be reduced.

The guard (13) can also be located on an extension plate (T) illustrated by the dotted line in FIG. 1, to be hooked on the edge of the outer mouth of the container.

A vent tube (6), made of rubber, silicon, plastic, metal and ceramic, etc., goes through the wall of the joint (5) and is bent upward then extends inside the bottle container. Thus an air passage connection between outside and inside the PET bottle (P) is formed through the vent tube (6).

A supporting plate (12), which is to support the vent tube (6), is fixed in the tube of the joint (5). The vent tube (6) connects to the hole located in the middle of the supporting plate (12). Water holes (H) to receive water stream from the filler port (Pm) are provided on the surface of the supporting plate (12).

A chamber (14) is provided somewhere along the vent tube (6). Air sent from the side of the joint (5) into the vent tube (6) is temporarily pooled in the chamber (14), and then sent into the bottle container (2).

The chamber (14) is located above the female screw part (5a) mounted on the joint (5). If the joint (5) is provided on the filler port (Pm) and the chamber (14) is retained inside the filler port (Pm), then the water passage will become narrow and shut down the water stream.

A supplementary tube (15) made of an elastic material such as rubber, silicon, etc is provided on the entrance area of the vent tube (6). The supplementary tube (15) can be bent freely at the midpoint. A clamp (16) to retain the end of the supplementary tube (15) is provided on the side of the joint (5). When the supplementary tube (15) is bent and hooked with the clamp (16), the air passage in the supplementary tube (15) is choked, and the airflow is controlled. Therefore, the airflow and the amount of the purified water can be controlled by bending the supplementary tube (15).

A tube plug (17) is installed to external end of the supporting tube (15) and removed to send air inside the vent tube (6) at the time of water purification. When storing the water purifier (1), install the tube plug (17) into the supporting tube (16) so that the vent tube (6) is protected from dust or the like.

Air inlet of the vent tube (6) set according to the desired water depth in the receiving container can be used as a water level sensor. In other words, the air inlet of the vent tube (6) can be moved according to the desired purified water level, and the water purification can be stopped and the amount of purified water can be determined by positioning the air inlet of the vent tube (6).

For example, as described by two chain lines in FIG. 2, the air inlet located in the lower position (L1) of the joint (5) shuts down the airflow into the PET bottle because the water surface touches the air inlet when the purified water level reaches the position (L1), thus the water purification stops automatically. Also, when a large amount of water is needed in the receiving container, move the air inlet to the higher position (L2) above the joint (5), then the water purification can be successively done until the water level reaches the position (L2). Thus, the above procedure prevents the purified water from overflowing into the receiving container.

FIG. 2 illustrates another method to move the air inlet of the vent tube; the external end of the vent tube (6) is bent in an L-shape and the extension tube which can be slid upward and downward is provided on the end of the vent tube (6), or the flexible tube is connected to the external end of the vent tube, then the end of tube is clipped at the desired position.

An inflected portion (6a) is provided on the exit area of the vent tube (6). The inflected portion (6a) is formed in a reversed U-shape.

This inflected portion (6a) will prevent the water flowing back into the vent tube (6) even if water waves or vibration occur in the PET bottle (P), thus air comes easily into the PET bottle (P) through the vent tube (6).

Also, the exit area of the inflected portion (6a), which may be directed toward one side or downward (including diagonally downward), can prevent water flowing back. Therefore, as described in the present embodiment, the shape of the inflected portion (6a) can be either a reversed V-shape, a reversed L, etc as well as the reversed U-shape.

The diameter of the air outlet hole located on the end of the inflected portion (6a) is reduced so that the air outlet pressure applied from the inflected portion (6a) into the bottle increases, thus the air flows stably during the water purification completely and prevents the water flowing back into the vent tube (6).

The inflected portion (6a) with a small diameter will prevent the water flowing back into the vent tube (6) even if the inflected portion (6a) or chamber (14) is omitted. Therefore, the inflected portion (6a) and/or chamber (14) can be removed from the vent tube (6) if not necessary.

As shown in FIG. 2, male screw parts (2a) and (2b) are provided on the ends of the filter case (2). The male screw part (2a) can engage to the female screw part (5b) located on the lower edge of the joint (5).

A lid plate (4) is provided on the end of the male screw parts (2a) and (2b). Water holes (K) are provided on the lid plate (4) and a net (7) to cover the water holes (K) is set on the outer surface of the lid plate (4). The net (7) prevents the filter medium (3) popping out of the water holes (K).

A partition wall (8) to separate water holes (K) is provided inside the lid plate (4). Partition wall (8) centered between the adjacent water holes (K) extends inside the filter case (2). Water taken into the filter case (2) flows evenly into the entire filter medium (3) by the partition wall (8).

The tubular adaptor (19) is fixed with the male screw part (2b) of the filter case (2). The valve body (27) and valve lid (28) are provided on the lower part of the adaptor (19).

A projection is provided on the lower center of the circular valve body. O-ring (27a) is provided on the tip of the projection. Water holes (L) are provided on the plate surface of the valve body (27) together with the water holes (K) of the filter case (2).

The valve lid (28) consists of a tubular part (28a) and a funnel part (28b). The funnel part (28b) is provided inside the tubular part (28a). The funnel part (28b) extends downwardly in the direction of the center of the diameter, and a water supply hole (M), which pools the purified water in one place from where water flows out, is provided on the bottom central part of the water purifier. A female screw part which can be engaged with the adaptor (19) is provided on the top of the tubular part (28a).

The illustration in FIG. 2 shows the adaptor (19) and the valve lid (28) engaged with the screw. There is a clearance between the slant face of the funnel part (28b) and the O-ring (27a), thus the purified water flows downward from the water supply hole (M). Tightening the valve lid (28) to the adaptor (19) as shown in FIG. 2 causes the slant face of the funnel part (28b) to closely touch the O-ring, then the water supply hole (M) closes.

The reason water is pooled in the water supply hole (M) with the funnel part (28b) and then flows down is that the air below the valve lid (28) should not be absorbed into the filter medium (3) during the water purification.

As a comparison, when purifying the water without the valve lid (28), the water passing through the filter medium (3) drops down through the water holes (L) of the valve body (27). In this case, uneven water passage occurred in the filter medium (3) making it difficult to supply an even and stable amount of water to the water holes (L), thus some water holes would obtain the sufficient water and others would obtain insufficient water.

Under this circumstance, even if air is sent to the PET bottle through the vent tube, and air is absorbed into the PET bottle (P) through a certain water hole (L) in which a less amount of water passes, then the amount of the air passing through the vent tube (6) will decrease, thus the water cannot flow easily to the water purifier (1).

On the contrary, if the purified water pools in a certain place of the water supply hole (M) and flows down, the water supply hole (M) is closed by the water stream, and the air stream from the lower part of the filter medium (3) to the PET bottle is shut down, then an effective function of the vent tube (6) will make the water flow easily into the water purifier (1).

Male screws (2a) and (2b) located on the top and bottom of the filter case (2) are manufactured so that each diameter and pitch should be the same. When setting the filter case (2) upside down, the valve body (27) and the valve lid (28) can be engaged with the male screw part (2a), then the joint (5) can also be engaged with the male screw part (2b).

Activated carbon, ceramic, mineral, etc are used for the filter medium (3). The filter medium (3) needs regular cleaning or reactivating process. For instance remove the filter medium (3) from the filter case (2) and heat treat. Or set the filter medium (3) upside down in the filer case (2), thus the filter medium (3) can be simply washed in a reverse direction.

When the filter case (2) incorporates heat resistant material such as metal, plastic, ceramic or the like, the filter medium (3) can be easily reactivated by heating directly in an oven, cooking range or the like, or by washing in hot water.

As illustrated in FIG. 1, the legs (28c) are provided equally spaced around the lower edge of the valve lid (13). During the water purification, when the legs (28c) are set on the receiving container such as a pan, etc, and the water purifier (1) is kept under orthostatic conditions, the purified water flows down from the clearance of the legs (28c) to the receiving container. Thus, when it takes a long time to purify the water, the user does not have to hold the water purifier (1) for such a long time, which contributes to the labor saving.

One example for the use of the water purifier (1) follows.

In purifying water, first, fill the prescribed amount of water in the PET bottle, then set the joint (5) to engage with the filler port (Pm), and the water purifier upside down.

Second, turn the PET bottle upside down together with the water purifier (1), then remove the plug (17) to open the air passage of the vent tube (6). Thus, air flows into the bottle through the vent tube (6), and the water in the PET bottle (P) passes through the filter medium (3) and flows dow-n from the water supply hole (M).

Air flowing into the vent tube (6) is temporarily pooled in the chamber (14), and constantly appears as air bubbles in the PET bottle because of the constant air pressure.

It is favorable to open the air passage in the vent tube (6) after turning over the PET bottle (P) as mentioned above, since water may possibly come into the air passage by the sudden water flashing occurring when turning over the bottle unless the vent tube is closed. In other words, a smooth start of air flowing into the vent tube (6) depends on the timing of removing the plug (17).

When storing the water purifier (1), after no water is left in the PET bottle, push the side of the bottle with the vent tube (6) closed, then water left in the filter medium (3) is pushed out by the air pressure. After removing the water left in the filter (3), remove the joint (5) from the filler port (Pm). The filter medium (3) dries easily and bacteria cannot return while the condition of the filter medium (3) is well maintained. Also, the volatile impurities such as chlorine can be easily removed from the filter medium (3).

As described in the $1^{st}$ embodiment of the water purifier (1), water purification can be done simply by just installing the water purifier to the PET bottle (P). When purifying water, a certain amount of air flows into the PET bottle (P) from the vent tube (6), and water flows stably out of the filler port (Pm). Also, no processing needed for the PET bottle saves operational time and expense.

Other embodiments in this invention are described as follow.

In the following embodiments, the same references are appended to each component comprising substantially identical functions and effects compared with the aforementioned $1^{st}$ embodiment, and the explanation should be omitted.

Figure 4:
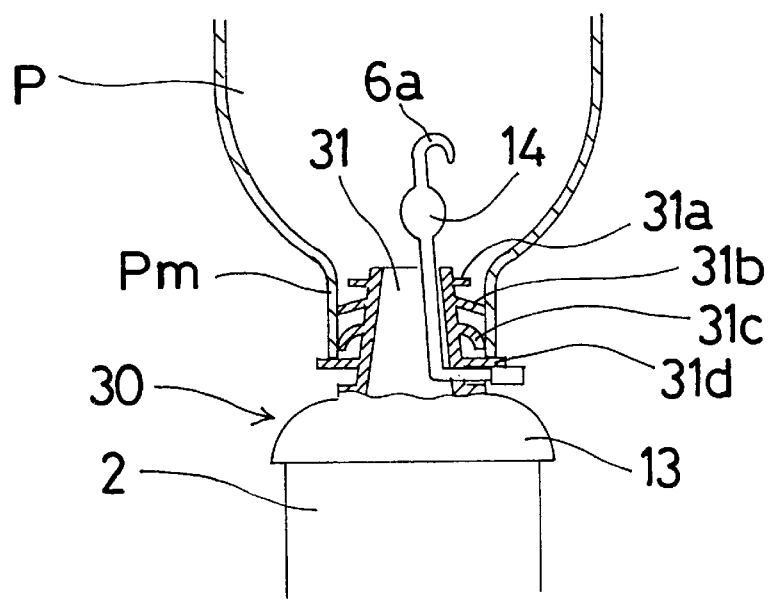
FIG. 4 is a partial cross sectional view describing a usage of the water purifier used for the bottle container in the No. 3 embodiment of this invention.

FIGS. 3 and 4 show the $2^{nd}$ embodiment in this invention.

With the water purifier (30) in the $2^{nd}$ embodiment, a push-in joint (31) is provided instead of the screw-in joint (5).

Circular discs (31a) to (31d) comprised of elastic material such as plastic, rubber, or the like are fixed circularly at regular intervals on the surface of the joint (31). Each outer diameter of the circular discs (31a) to (31d) becomes smaller toward the top. Once pressure is applied to the circular discs (31a) to (31d), each plate face bends naturally to the point of application of force.

The vent tube (6) runs inside through the joint (31). The vent tube (6) runs through from the side of the joint (31) on the wall face, and then extends upward. The vent tube (6) is cast as a single unit and may be fixed with an adhesive agent or the like on the inner wall of the joint (31).

When using the water purifier (30), insert the joint (5) into the filler port (Pm) of the PET bottle (P), and then push the joint (31) into the filler port (Pm). At this point, as illustrated in FIG. 4, the outer circular parts of the circular discs (31a) to (31d) bend backward and touch the inner wall of the filler port (Pm), which prevents water leakage. A certain amount of the air flows into the PET bottle via the vent tube (6) and the chamber (14).

In the $2^{nd}$ embodiment, a push-in joint (31) is used so that the joint (31) is not necessary to be screwed into the filler port (Pm) during the water purification, therefore, the second embodiment is easier to be installed. Also, the water purifier (30) can be adapted to the many different sizes of the filler port (Pm) in accordance with the variety of the circular discs (31a) to (31d), which realizes wider bottle applications.

Figure 5:
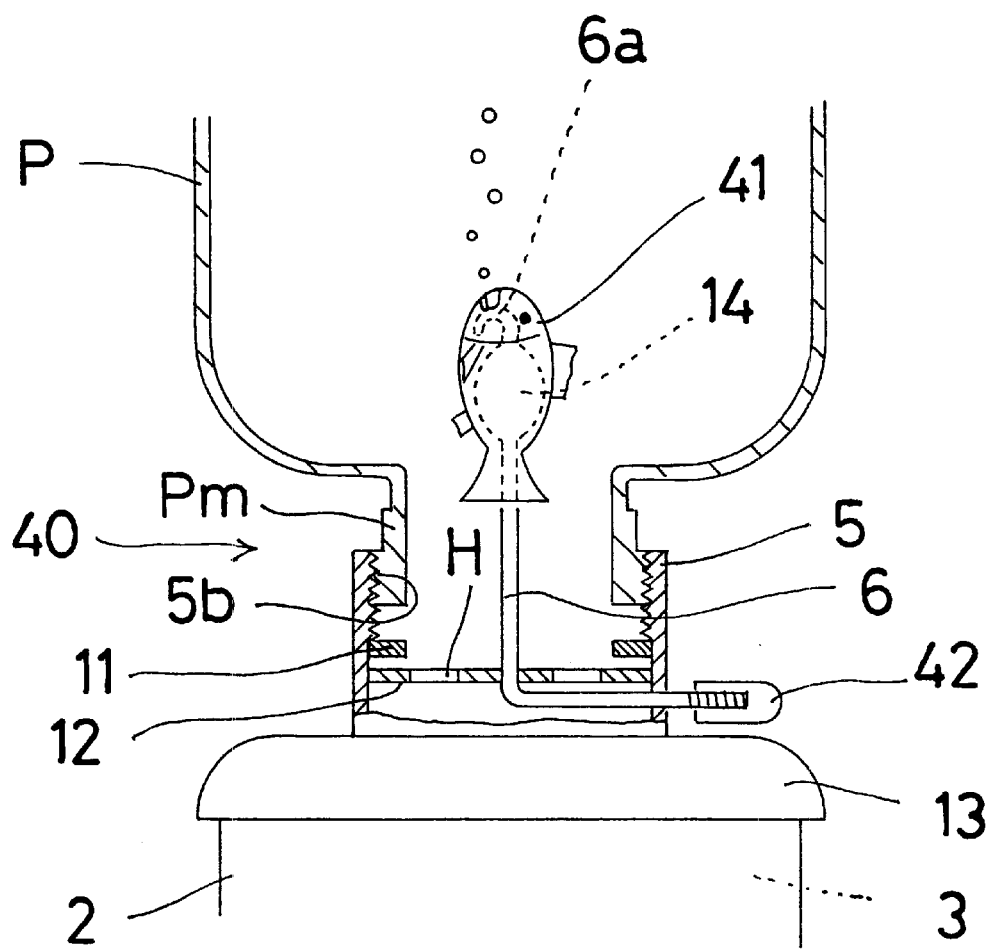
FIG. 5 is a partial cross sectional view showing the water purifier used for the bottle container in the No. 3 embodiment of this invention.

FIG. 5 shows the water purifier for a bottle container as the $3^{rd}$ embodiment in this invention.

A decoration is provided outside the chamber (14) of the water purifier (40).

A fish shaped cover (41) is provided on the top of the vent tube (6). The body of the fish is located on the chamber (14) and the mouth of the fish is located on the tip of the inflected part (6a).

During the water purification, a certain amount of purified water flows to the lower part of the water purifier (40) and air flowing into the PET bottle (P) from the vent tube (6) via the chamber (14). Air flowing into the PET bottle (P) rises up constantly as air bubbles from the mouth area of the cover (41) at a regular pace. Looking through the transparent PET bottle (P), it is visually effective since a fish seems to be swimming and blowing air in the water.

The decoration covering the chamber (14) is not only the shape used in the $3^{rd}$ embodiment, but also includes characters such as dolls, vehicles, architecture, nature items (including mountains, woods, etc) or the like. In the $3^{rd}$ embodiment, the decoration is provided as a cover (41), however, the decoration can be provided directly on the shape of the chamber (14).

The $3^{rd}$ embodiment comprises the component incorporating the screw type of airflow regulating valve (42) on the vent tube (6). In case where the air flow regulating valve (42) is used, the amount of the air flowing into the PET bottle (P) increases and decreases by adjusting the screw, thus the amount of water flowing into the water purifier (40) can be fine-adjusted, and the purification will be more efficient. As for the airflow-regulating valve, the gate type, ball type or the like can be adopted as well as the screw type.

FIGS. 6 and 7 show the $4^{th}$ embodiment in this invention.

The water purifier (50) shown in the $4^{th}$ embodiment comprises wing plates (51, 51) in addition to the guard (13).

Supporting axes (52a) and (52b) are provided on the lower edge of the joint (5). The interval between supporting axes (52a) and (52b) is almost equal to the width of the wing plates (51, 51). Supporting flaps (53a) and (53b) are provided on the upper edge of the wing plates (51, 51). An axis hole in which the supporting axis (52a) and (52b) can penetrate is provided in the center of the supporting flaps (53a) and (53b). When installing the supporting flaps (53a) and (53b) in the supporting axes (52a) and (52b), the wing plates (51, 51) turns up and down in the center of the supporting axes (52a) and (52b).

The surfaces of the wing plates (51, 51) are in the shape of a circular arc extending along the tube side of the filter case (2). When lowering the wing plates (51, 51), the wing plates (51, 51) cover the side of the filter case (2).

A stopper (54) is provided on the joint (5). When the wing plates (51, 51) turn upward, the upper end of the wing plates (51, 51) touches the stopper (54), then the wing plates are kept horizontally.

By using wider wing plates (51, 51) of the $4^{th}$ embodiment while the water is being purified, the water purifier (50) can be easily set on a pot, kettle, pitcher, or the like. Also, when the wing plates (51, 51) can be folded along the side of the filter case (2) and the water purifier (50) can be compactly stored.

To enhance the stability of the water purifier (50), a slip stopper (55) can be provided on the side edge of the wing plates (51, 51).

FIG. 8 shows the $5^{th}$ embodiment in this invention.

In the water purifier (55) as the $5^{th}$ embodiment, a bi-block vent tube (i.e. upper tube (56) and lower tube (57)) is applied. The upper tube (56) comprising the chamber (58) is inserted onto the lower tube (57). The chamber (58) and the inflected portion (56a) are successively formed from the upper tube (56). The end of the lower tube (57) in the chamber (58) is open.

Moving the edge of the lower tube (57) deeply inside the chamber (58) increases or decreases the capacity of the chamber (58) and adjusts the air pressure in the PET bottle (P) from the outside. Also, as shown in FIG. 8, the air passage cannot be easily shut down since the water is pooled around the lower tube (57) even when water enters the chamber (58). Therefore, the airflow amount is to be stabilized and water can go smoothly through the water purifier (55).

Even if water is pooled in the chamber (58), such water will be easily removed by separating the upper tube (56) and the lower tube (57).

In addition to the explanation provided for the aforementioned embodiments 1 to 5, other variations as described in FIGS. 9 to 13 can be applied.

One variation shown in FIG. 9 comprises the funnel shaped cap (61) connected to the filter medium (3). The male screw part of the cap (61) is fixed on the female screw part of the adaptor (19). Purified water goes down from the water supply hole (M) of the cap (61) through the water outlet holes (K) and (L). Purified water can be easily obtained in the mouth of the PET bottle (B) or the like by using the cap (61).

Figure 10:
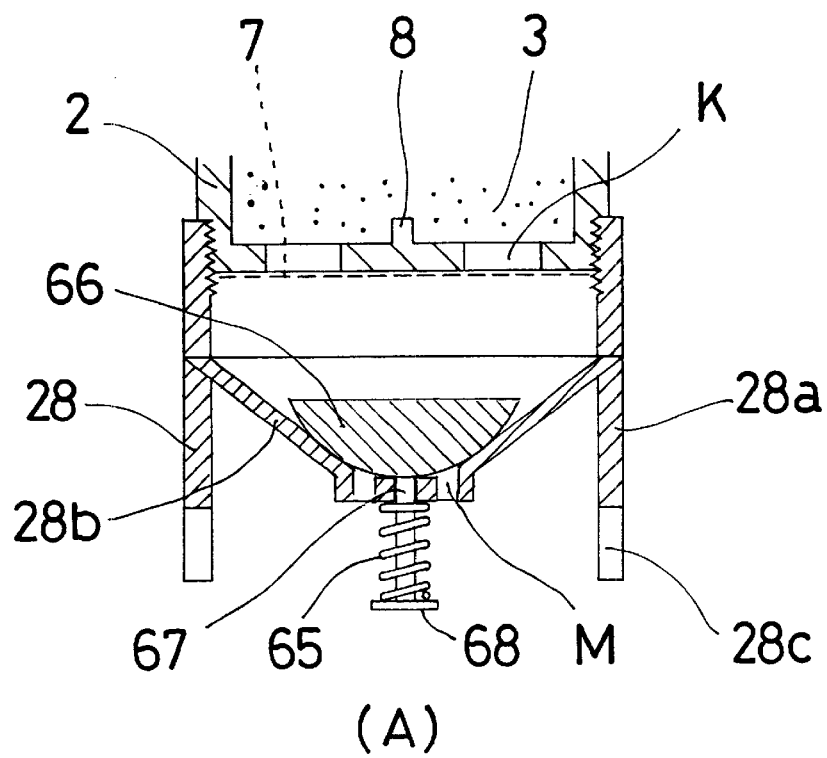
FIG. 10 shows a variation of the aforementioned Nos. 1 to 5 embodiments, in which (A) is a partial cross sectional view showing that the valve is closed, and (B) is also a partial cross sectional view showing that the valve is open.
Figure 10:
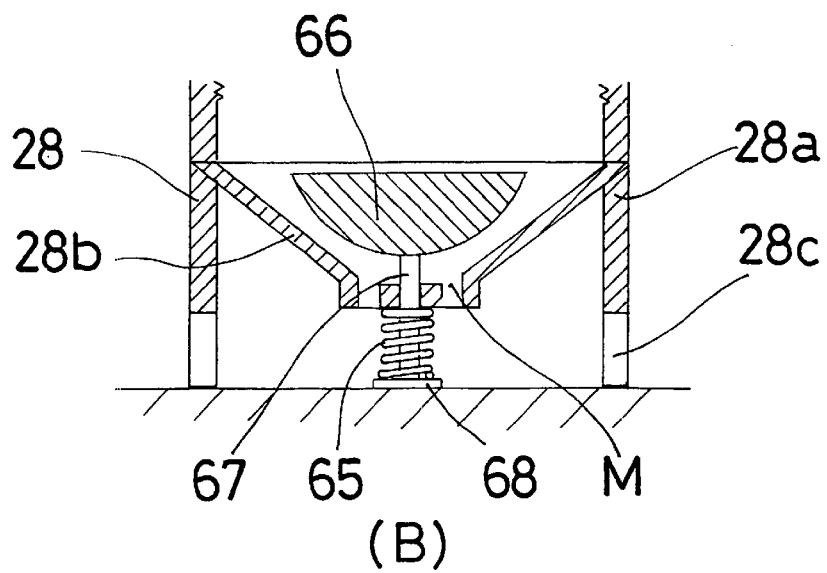

Another variation shown in FIG. 10 comprises the openable and closable valve (66) functioning with a coil spring (65) provided inside the valve lid (28). A supporting pin (67) is movably inserted in the center of the funnel part (28a). Water supply holes (M) are provided outside the supporting pin (67).

The coil spring (65) is installed around the outer circumference of the supporting pin (67) and supported by the spring washer (68) located on the lower edge of the supporting pin. The valve body (66) is fixed on the upper edge of the supporting pin (67).

As shown in FIG. 10 (A), when the water purifier is lifted up, the lower surface of the valve body (66) sticks fast to the funnel part (28b) by repulsive force of the coil spring (65), then closes the water supply hole (M). On the other hand, as shown in FIG. 10 (B), when the water purifier is set on a flat place, the spring washer (68) pressures the coil spring with the weight of the water purifier, pushing up the valve body (66) which opens the water supply holes (M).

Figure 11:
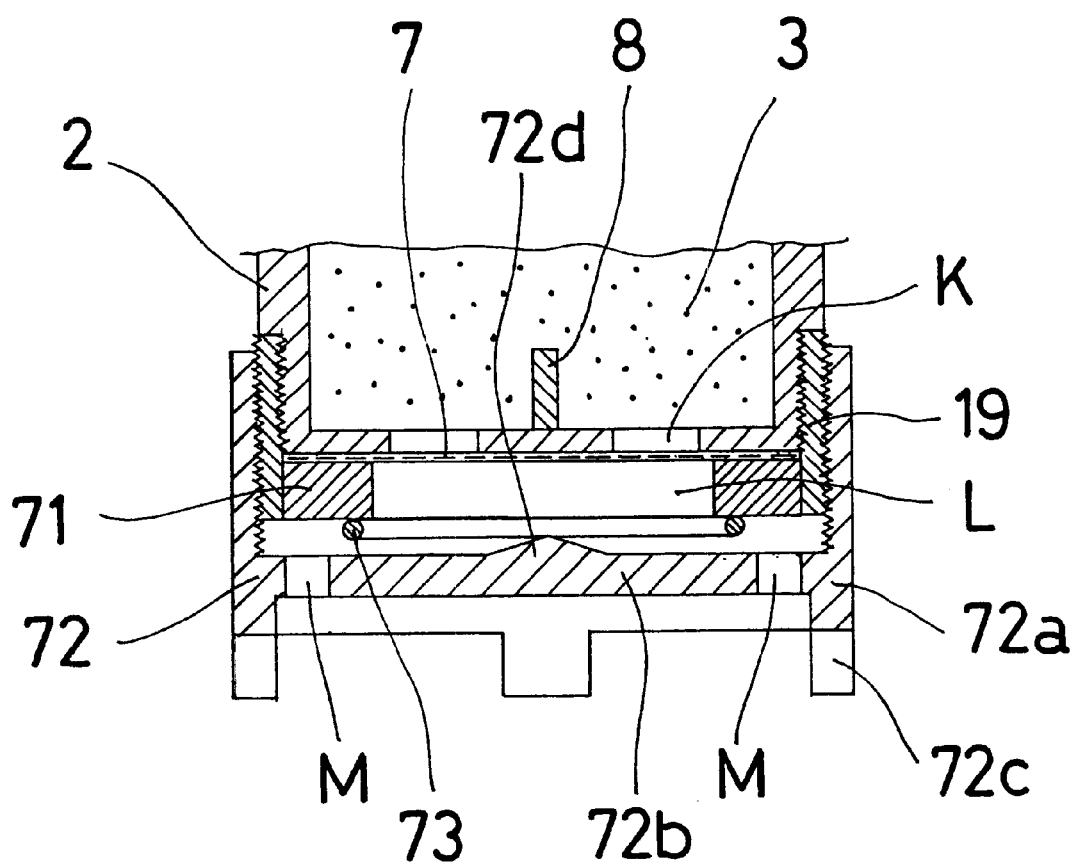

The variation shown in FIG. 11 comprises the flat valve body (71) and the valve lid (72). The water passage hole (L) is provided in the middle of the valve body (71). O-rings (73) are fixed on the lower face of the valve body (71).

The valve lid (72) consists of tube part (72a) and lid part (72b). A female screw part is provided on the upper edge of the tube part (72a) to engage with the adaptor (19). Leg (72c) is provided on the lower edge of the tube part (72a).

The water supply holes (M) are circularly provided on the external circumference of the lid part (72b).

A bulge (72d) gradually sloping down to the outer diameter is created in the center on the upper surface of the lid part (72b).

When purified water goes through the water passage holes (K) and (L), and contacts the lid part (72b), the purified water is guided by the slope of the bulge (72d) and goes down through the water supply holes (M). In FIG. 11, when the valve lid (72) is tightened up with the adaptor (19) the upper surface of the lid part (72b) is pressed to the O-rings (73) and water passage to the water supply holes (N) is shut down.

FIG. 12 shows another variation wherein the air outlet part of the vent tube (81) comprises porous material (82) made of ceramic or the like. Air flowing into the vent tube (81) becomes fine air bubbles and floats up in the bottle container. Therefore, the contact area of water and air in the bottle container increases, and the oxygen content increases.

FIG. 13 shows a further variation wherein the air inlet part of the vent tube (91) comprises a hand pump with a check valve. Check valves (93) and (94) are installed on the inlet and outlet parts. Air hole (95a) is provided on the cap (95) of the inlet. When the hand pump (92) starts, air drawn into the air hole (95a) is pumped into the bottle container via the vent tube (91). Even if the pressure in the bottle container increases, the air will not go back to the vent tube (91) through the check valve (94).

Thus, using the hand pump (92) increases the air pressure in the bottle container and accelerates the filtration rated at the time of water purification. Also, even if a thick filter medium applied makes it difficult to spout water, the water will be forced to pass through the filter medium.

As a type of embodiment in this invention, chamber (14), supplementary tube (17), inflected portion (6a) or the like can be omitted. When the joint (5) has a shape which can be tightly engaged with the filler port (Pm), an elastic plate type, a cork type or the like as well as the screw type can also be applied.

The filter case may be made of an elastic material such as rubber, resin or the like. When grabbing the elastic material used for the wall surface of the case at the time of water purification, the filter medium is easily moved, unfavorable water passage in the filter medium is stopped, and thus the filter medium can be used in a good condition.

In the aforementioned embodiments 1 to 5, the filter case is exposed. However, a capsule container to store the filter case may be installed in the lower part of the joint. In this case, a screw part or funnel part may also be provided on the upper and lower ends of the capsule container to allow the filter to be easily attached and removed from the water purifier.

POTENTIAL FOR INDUSTRIAL USE

Using a water purifier for bottle containers in this invention as described above will allow:
  (a) a certain amount of air to be stably supplied and the purified water to flow evenly;
  (b) water to easily contact the filter medium and improve purification rate since air is not easily drawn into the bottle container via a filler port;
  (c) the water purifier to simply connect without any procedure such as hole making or the like to the bottle container;
  (d) the purification flow rate to be adjusted by controlling the amount of air entering into the vent tube.

Therefore, filtration rate can be improved and fine purified water can be obtained without changing the type or quantity of the filter medium.

What is claimed is:

1. A water purifier which can be connected to a filler port of a bottle container and also be readily removed, comprises
    a filter case;
    a filter medium fixed inside the filter case;
    a joint part extending from the upper side of the filter case and mounted in the filler port of the bottle container;
    a vent tube extending from the outer surface of the bottle container to the wall surface of the joint part, also extending from the filler port to the inside of the bottle container; and
    an airflow control means for controlling air flowing into said bottle, the airflow control means being provided on the vent tube and further comprising either:
        a supplementary tube made of an elastic material which can enlarge and reduce an air passage of said vent tube; or
        an air flow regulating valve which can be engaged with an edge of an opening of said vent tube.

2. A water purifier as recited in claim 1 wherein an air inlet of the said vent tube can be adjusted in accordance with a desired purified water level.

3. A water purifier as recited in claim 1 further comprising an air chamber provided at a midpoint of said vent tube and being able to enlarge the air passage of said vent tube.

4. A water purifier as recited in claim 3 wherein said vent tube is movably connected, and comprises upper and lower tubes, the upper and lower tubes being able to be separated from each other at a lower position of said air chamber.

5. A water purifier as recited in claim 1 wherein said vent tube comprises an inflected part being able to prevent water from flowing back into the bottle container.

6. A water purifier as recited in claim 1 wherein an air outlet of the vent tube is gradually reduced in diameter toward an end thereof.

7. A water purifier as recited in claim 1 wherein said filter case comprises wing plates which can be opened and closed to a nearly horizontal position from a position adjacent to a side of said filter case.

8. A water purifier as recited in claim 1 wherein a funnel is provided on a downstream side of said filter case so that the purified water collects at a water supply hole thereof and flows downward.

9. A water purifier as recited in claim 1 wherein porous media is provided on an air outlet of said vent tube.

10. A water purifier as recited in claim 1 wherein a check valve is provided on an air inlet of said vent tube.

* * * * *